(12) United States Patent
Momozu et al.

(10) Patent No.: US 8,020,469 B2
(45) Date of Patent: Sep. 20, 2011

(54) BASE FRAME AND PARKING BRAKE DEVICE

(75) Inventors: Masateru Momozu, Wako (JP); Naoto Shibui, Wako (JP); Hideto Nebuya, Wako (JP); Satoru Masuda, Yokohama (JP); Yukiyoshi Akutsu, Yokohama (JP); Tomoya Sugiyama, Yokohama (JP)

(73) Assignees: Honda Motor Co., Ltd., Tokyo (JP); Otsuka Koki Co., Ltd., Yokohama-shi (JP)

( * ) Notice: Subject to any disclaimer, the term of this patent is extended or adjusted under 35 U.S.C. 154(b) by 702 days.

(21) Appl. No.: 11/469,037

(22) Filed: Aug. 31, 2006

(65) Prior Publication Data

US 2007/0068326 A1  Mar. 29, 2007

(30) Foreign Application Priority Data

Aug. 31, 2005  (JP) ................. 2005-251734

(51) Int. Cl.
*G05G 1/04* (2006.01)
(52) U.S. Cl. .......................................... 74/523
(58) Field of Classification Search .......... 74/473.3, 74/519, 523, 527, 537, 575, 577 R, 577 S
See application file for complete search history.

(56) References Cited

U.S. PATENT DOCUMENTS

| 4,545,467 A | * | 10/1985 | Fernandez et al. ........... 192/218 |
| 5,462,146 A | * | 10/1995 | Doolittle et al. ............. 192/218 |
| 5,992,264 A | | 11/1999 | Brock, Sr. |
| 6,267,217 B1 | * | 7/2001 | Malone et al. ............... 192/218 |
| 7,028,574 B1 | | 4/2006 | Bell et al. |

FOREIGN PATENT DOCUMENTS

| DE | 2 226 967 | 12/1973 |
| DE | 10006832 A1 | 9/2001 |
| JP | 63-196769 | 12/1988 |
| JP | 7-016214 | 3/1995 |
| JP | 9-039595 | 2/1997 |
| JP | 9-202220 | 8/1997 |
| JP | 10-203328 | 8/1998 |

* cited by examiner

*Primary Examiner* — Vicky Johnson
(74) *Attorney, Agent, or Firm* — Rankin, Hill & Clark LLP

(57) ABSTRACT

A base frame 1 is such as to be fixedly provided on a body so that a parking brake device 2 is provided thereon which causes a brake applying portion of a parking brake to apply the brake and release the brake so applied, a base frame main body 1*a* is molded into an integral unit, a parking device mounting portion 10A where the parking brake device 2 is mounted is formed on one side A of the base frame man body 1*a*, and a gearshift device mounting portion 10B where a gearshift device of a transmission is provided is formed on the other side B thereof.

9 Claims, 4 Drawing Sheets

US 8,020,469 B2

BASE FRAME AND PARKING BRAKE DEVICE

TECHNICAL FIELD

The present invention relates to a base frame on which a parking brake device is provided which causes a brake applying portion of a parking brake to apply the brake and release the brake so applied and which is fixedly provided on a body and a parking brake in which the parking brake device is mounted on the base frame.

BACKGROUND ART

A parking brake device of a conventional parking brake is mounted directly on a floor of a body of a vehicle or is mounted on the floor via a bracket. In many cases, a selector lever which is a gearshift device of a transmission, a center console and the like are provided near the periphery of an operating lever of the parking brake of this type, leading to a problem that arranging these components properly and securing spaces therefor is not necessarily easy.

In addition, in the parking brake of this type, the operating lever is generally mounted in the center console in such a manner as to be left exposed therefrom. This caused a problem that an accommodation space provided in the center console for a cup or the like is limited. To solve the problem, there exists a parking brake disclosed in Patent Document No. 1.

Namely, the parking brake so disclosed has a long arm member which extends upwards and which is provided at a distal end portion of a long intermediate member which is mounted in such a manner as to rotate at a proximal end portion thereof, and a grip is provided on an upper end portion of the arm member. In addition, the intermediate member is accommodated inside a center console, and most of the arm member is made to appear from the inside to the outside and disappear from the outside to the inside of the center console, so that the accommodation space provided in the center console is not limited by the intermediate member and the arm member.

[Patent Document No. 1] German Patent No. 2226967

DISCLOSURE OF THE INVENTION

Problem that the Invention is to Solve

With the related art like this, although the accommodation space provided in the center console for accommodating a cup or the like can be secured, arranging the operating lever of the parking brake, the selector lever of the transmission, the center console and the like and securing spaces therefor still remains difficult. In addition, since the intermediate member of the operating lever is long and the arm member and the ratchet plate are spaced apart from each other, the diameter of a toothed portion of the ratchet plate becomes small, and hence, there was caused a problem that the meshing load becomes large. Furthermore, since the arm member is also long, there was caused a problem that the transverse rigidity becomes weak.

SUMMARY OF THE INVENTION

The invention was made in view of the problems inherent in the related art, and an object is to provide a base frame which can easily secure space lying near the periphery of a parking brake device of a parking brake and a parking brake in which space lying near the periphery of the parking brake is secured by mounting the parking brake on the base frame, the meshing load between the operating lever side with a ratchet plate can be reduced, and furthermore, the transverse rigidity of the operating lever can be increased.

Means for Solving the Problem

The gist of the invention made to achieve the object resides in an invention described in each of the following items.

[1] A base frame (1) comprising:
a parking device mounting portion (10A) where a parking brake device (2) is fixedly provided, the parking brake device (2) applying and releasing a parking brake;
a gearshift device mounting portion (10B) where a gearshift device is fixedly provided, the gearshift device controlling a gearshift operation of a transmission; and
a body mounted portion (11) which is fixedly provided on a body.

[2] The base frame (1) as set forth in item [1], further comprising a base frame main body (1a) which is formed into a plate and in which the parking device mounting portion (10A) is provided on one side and the gearshift device mounting portion (10B) is provided on the other side thereof.

[3] The base frame (1) as set forth in item [2], wherein the base frame main body (1a) is molded by casting.

[4] The base frame (1) as set forth in item [1], comprising a console mounting portion (10C) where a console (100) is mounted.

[5] The base frame (1) as set forth in item 1, comprising a gearshift cable mounting portion (5) where a gearshift cable is mounted which transmits a gearshift operation by the gearshift device to the transmission.

[6] A parking brake in which the parking brake device (2) is mounted on the parking brake mounting portion (10A) of the base frame (1) set forth in item 1,
the parking brake device (2) comprising:
a ratchet plate (30) which is fixedly provided on the base frame (1) and comprises a toothed portion (32) on an outside diameter portion (31) thereof;
a pawl (33) which adapted to engage with and disengage from the toothed portion (32) of the ratchet plate (30);
an operating lever (20) comprising
a rotational base portion (40) which is pivotally supported on the base frame (1) at one end portion by a pivot shaft (21) and to which a brake cable (110) is connected and
an intermediate member (50) which extends upwards from the other end portion of the rotational base portion (40); and
wherein the ratchet plate (30) is provided on the rotational base portion (40) in a position lying closer to the intermediate member (50) than an intermediate portion (50) of the rotational base portion (40) in such a manner as to erect therefrom, and is formed into an arc which extends rearwards from a lower end portion towards an upper end portion thereof.

The center console mounting portion (100) can be formed on the base frame main body (1a) where the console (100) is mounted which covers part of the parking brake device (2) and part of the gearshift device and in which a small articles accommodating compartment or the like is formed. In this case, since the paring brake system (2), the gearshift device of the transmission and the console (100) can be mounted on the single base frame main body (1a), securing space becomes easier. In addition, the adjustment of the mounting positions of those three members becomes unnecessary, and the members can be mounted easily and quickly with an accurate positional relationship.

In the parking brake device (2) of the barking brake which is mounted on the parking device mounting portion (10A) of the base frame main body (1a), the ratchet plate (30) is fixedly provided on the base frame (1). In the operating lever (20), which includes the pawl (33) adapted to be brought into engagement with and disengagement from the ratchet plate (33), the one end portion of the rotational base portion (40) is pivotally supported on the base frame (1) in such a manner as to rotate by the pivot shaft (21). The brake cable (110) is connected to the rotational base portion (40), and the intermediate portion (50), which extends upwards, is provided at the other end portion thereof. The pawl (33) is provided below the intermediate member (50) and can be put into operation by operating an operating knob (61).

Since the ratchet plate (30) is provided on the rotational base portion (40) at a position lying closer to the intermediate member (50) than the intermediate portion thereof in such a manner as to erect therefrom. The ratchet plate (33) is formed into the arc which extends rearwards from the lower end portion towards the upper end portion thereof, and the pawl (33) is brought into engagement with and disengagement from the toothed portion (32) formed on the outside diameter portion (31) which faces the intermediate member (50) by virtue of operations controlled by the operating lever (20) side.

As has been described above, since the ratchet plate (30) is provided on the rotational base portion (40) at the position lying closer to the intermediate member (50) than the intermediate portion thereof in such a manner as to erect therefrom, the diameter of the ratchet plate (30) is increased, whereby the meshing load can be reduced. In addition, in the rotational base portion (40), a length thereof from the pivot shaft (21) which constitutes the center of rotation does not have to be elongated, thereby making it possible to increase the transverse rigidity of the operating lever (20).

ADVANTAGES OF THE INVENTION

According to the base frame of the invention, since the parking device mounting portion is formed on the one side, whereas the gearshift device mounting portion where the gearshift device of the transmission is formed on the other side, individual bases do not have to be provided separately where the parking brake device of the parking brake and the gearshift device of the transmission are mounted, whereby securing space near the periphery of the parking brake device becomes easy, and since the base frame main body is molded into the single unit, the parking brake device and the gearshift device can easily be mounted while maintaining an accurate positional relation therebetween.

In addition, since the console mounting portion where the console is mounted is formed, the necessity of a separate base where the console is mounted is obviated, and therefore, securing space becomes easier, and the console, the parking brake device and the gearshift device can be mounted while maintaining an accurate positional relation therebetween.

Additionally, according to the parking brake of the invention, since the parking brake device is mounted on the parking device mounting portion on the base frame, space lying near the periphery of the parking brake device can be secured.

In addition, since the ratchet plate is provided on the rotational base portion at the position lying closer to the intermediate member than the intermediate portion thereof in such a manner as to erect therefrom, is formed into the arc which extends rearwards from the lower end portion towards the upper end portion thereof and has the toothed portion formed on the outside diameter portion thereof, the diameter of the ratchet plate is increased, whereby since not only the meshing load can be reduced but also the overall length of the operating lever from the pivot shaft which constitutes the center of rotation can be made short, the transverse rigidity of the operating lever can be increased.

DETAILED DESCRIPTION OF THE PREFERRED EMBODIMENTS

Hereinafter, one preferred embodiment of the invention will be described based on the accompanying drawings.

FIGS. 1 to 4 show one embodiment of the invention.

Figure 1:
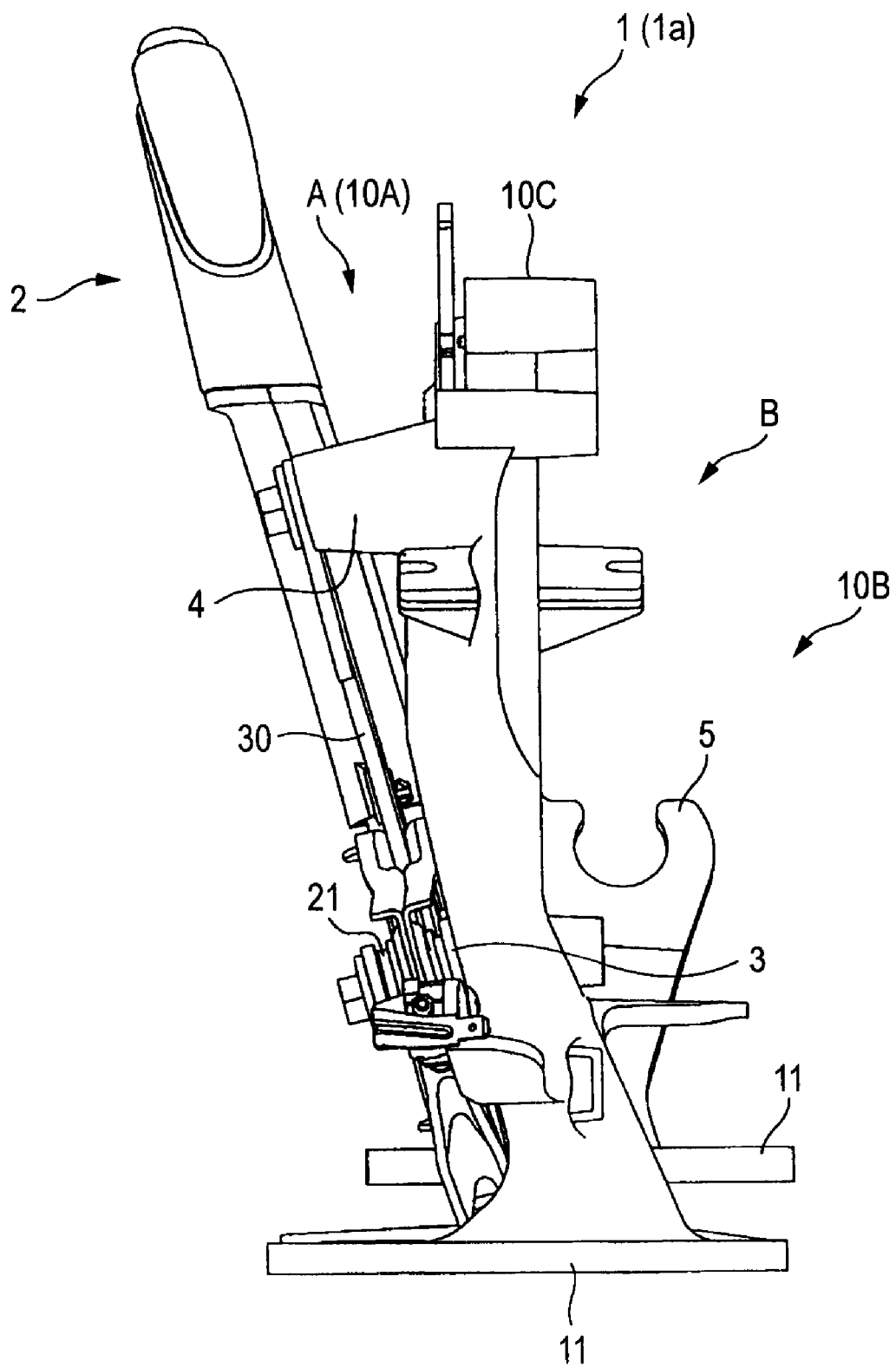
FIG. 1 is a back view which shows a state in which a parking brake device of a parking brake is mounted on a base frame according to an embodiment of the invention.
Figure 2:
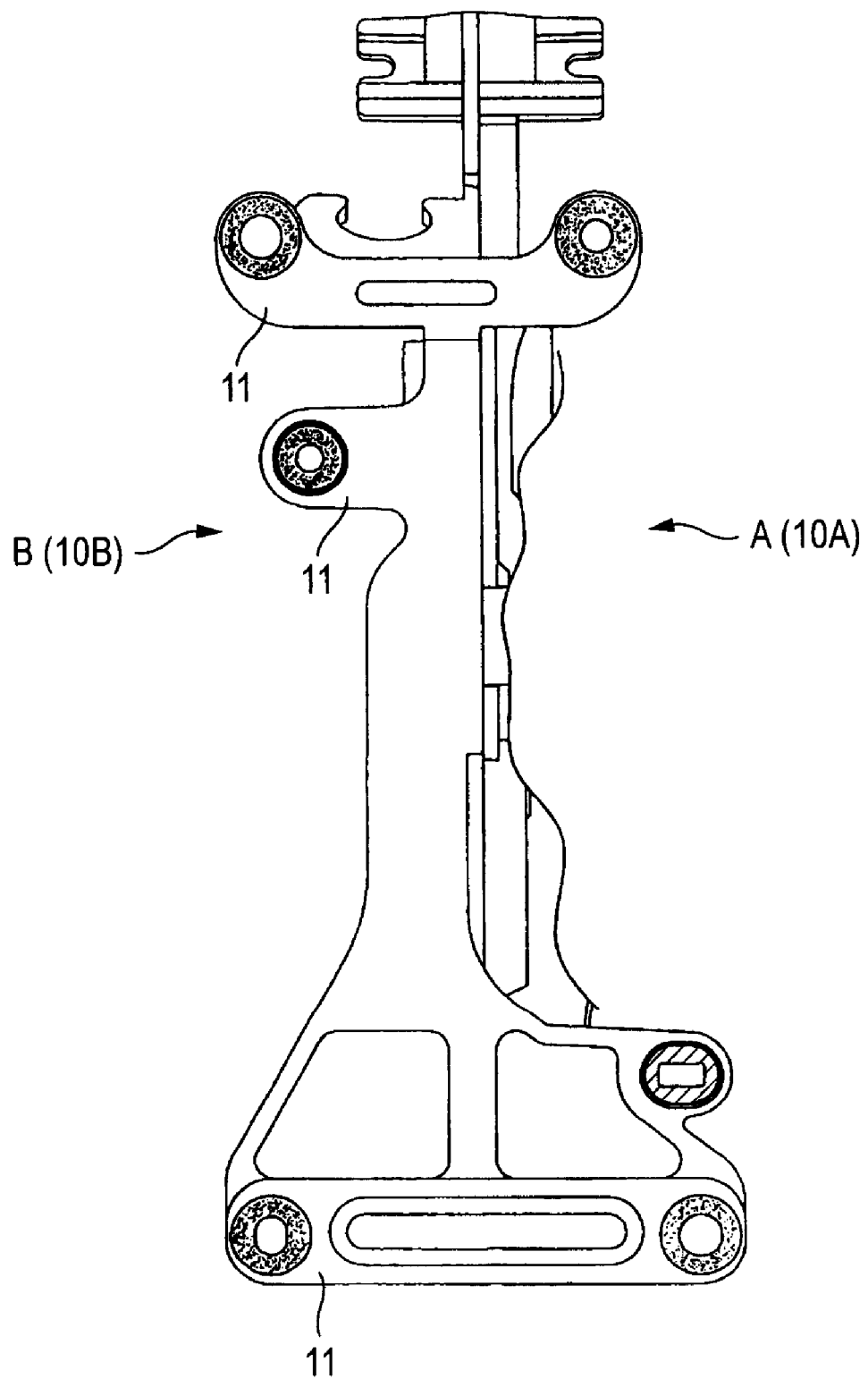
FIG. 2 is a bottom view which shows the base frame according to the embodiment of the invention.

As is shown in FIG. 1, a base frame 1 is such that a base frame main body 1a is provided on a floor of a vehicle in such a manner as to erect therefrom and is fixed thereto. Also, as shown in FIG. 2, the base frame 1 is molded into an integral unit, and bolt flanges 11 are formed thereon, so that the base frame main body 1a is fixed to the floor with bolts via the bolt flanges 11 so formed. Die casting is preferably used for the integral molding of the base frame 1 so as to obtain a high accuracy. The base frame main body 1a can have a parking brake device 2 of a parking brake and a gearshift device (not shown) of a transmission which are provided on both sides thereof.

As is shown in FIGS. 1 and 2, one side A of the base frame main body 1a is formed as a parking device mounting portion 10A where the parking brake device 2 is mounted, and the other side B is formed as a gearshift device mounting portion 10B where the gearshift device of the transmission is mounted. On this gearshift device mounting portion 10B a gearshift cable mounting portion 5 is provided which transmits a gearshift operation by the gearshift device to the transmission.

In addition, a console mounting portion 100 where a center console 100 (the console), which is not shown, is provided is formed on the base frame main body 1a.

Figure 3:
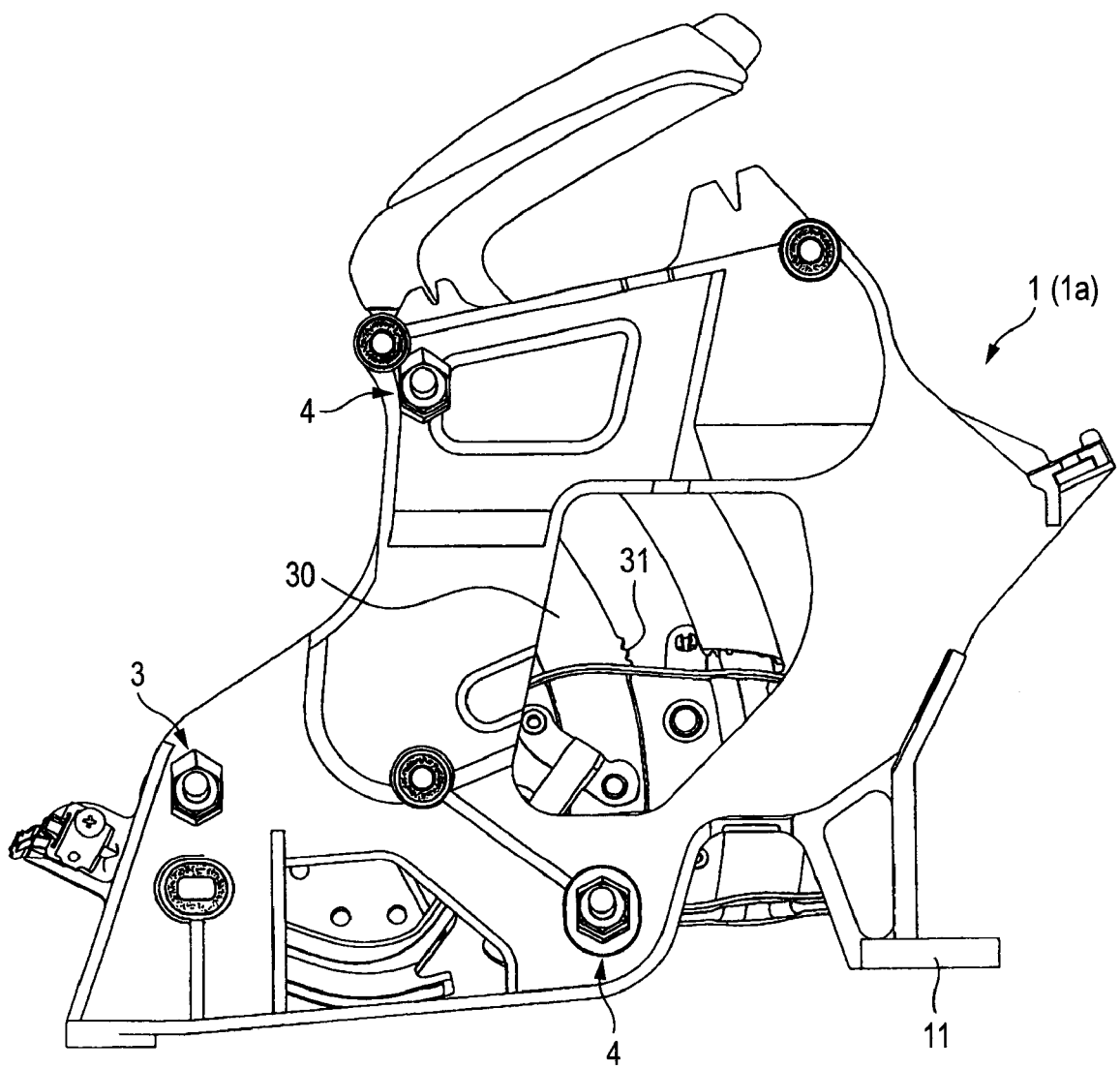
FIG. 3 is a left side cross-sectional view showing the state shown in FIG. 1 as viewed from a left side thereof.

As is shown in FIGS. 1 and 3, ratchet plate fixing portions 4, 4 where a ratchet plate 30 is provided in such a manner as to erect and is fixed and a pivotally supporting portion 3 where an operating lever 20 of the parking brake device 2 is pivotally supported in such a manner as to rotate are formed on the parking device mounting portion 10A.

Figure 4:
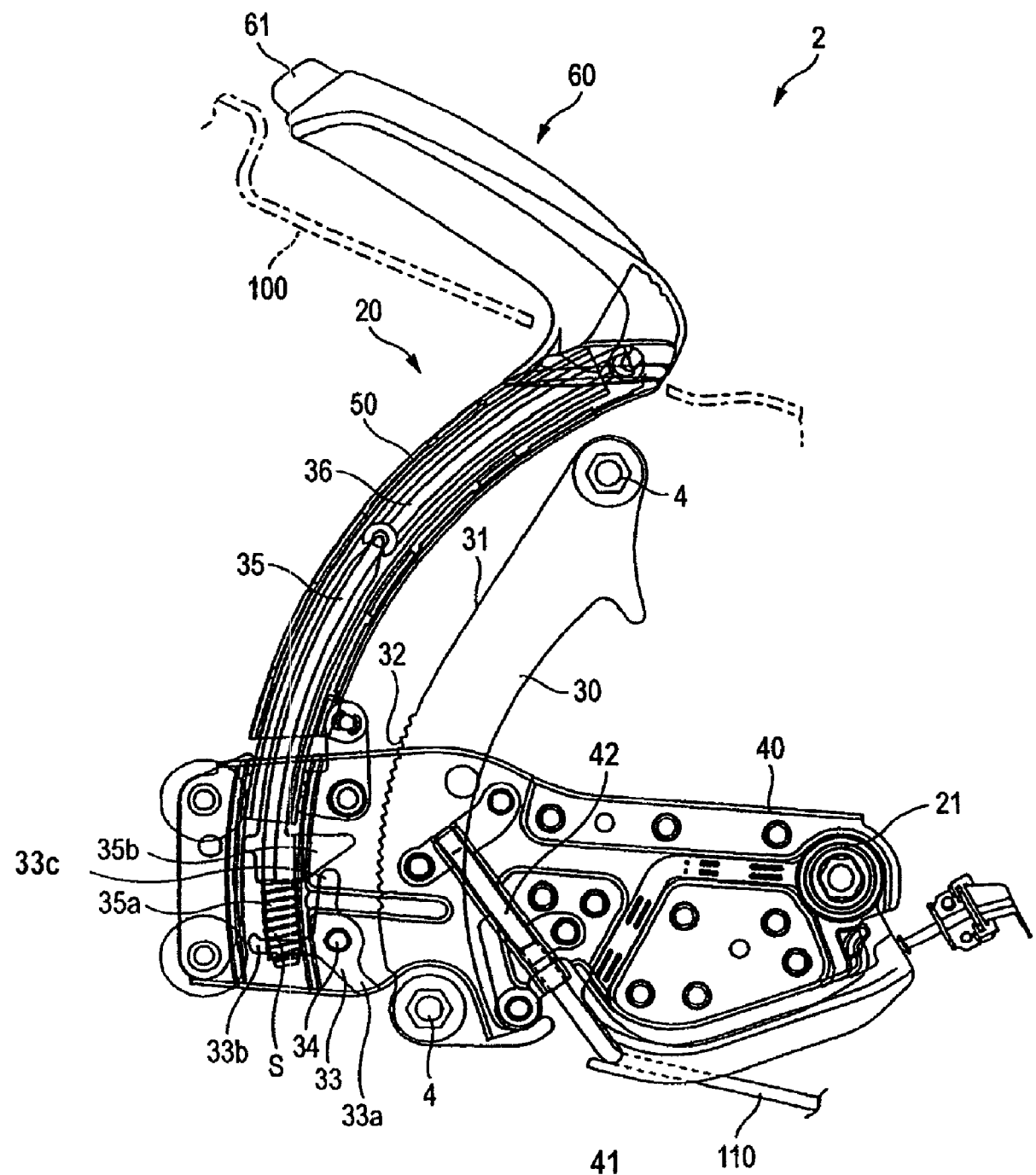
FIG. 4 is a right side view which shows a paring brake system of the parking brake on the base frame according to the embodiment of the invention.

As is shown in FIG. 4, the operating lever 20 of the parking brake device 2 includes a rotational base portion 40 which is pivotally supported on the pivotally supporting portion 3 of the base frame main body 1a at one end portion thereof by a pivot shaft 21, a tubular intermediate member 50 which extends upwards and rearwards from the other end portion of the rotational base portion 40 into an arc and a grip 60 which is mounted on an upper end portion of the intermediate member 50.

The rotational base portion 40 is made up of two sheets of metal which are molded and fixedly combined together, and a push wire guide 41 is mounted on the rotational base portion 40 at a position lying below the pivot shaft 21 for guiding a brake cable 110 which is made to extend thereto from a brake-applying portion (not shown) lying at a rearward position. A cable guide 42 is fixedly provided on an intermediate portion of the rotational base portion 40 above the push wire guide 41, and the brake cable 110 which is passed through the cable guide 42 is fixed to the rotational base portion 40 at an upper end portion of the cable guide 42.

The ratchet plate 30 is provided on the rotational base portion 40 at a position which is closer to the intermediate member 50 than the intermediate portion thereof in such a manner as to pass through a gap formed at a joint where the two sheets of metal making up the rotational base portion 40 are jointed together. The ratchet plate 30 has an arc shape which extends rearwards while extending upwards from a lower end portion to an upper end portion thereof, and the lower end portion and the upper end portion are fixed to the ratchet plate fixing portions 4, 4 with bolts, respectively. This ratchet plate 30 has a toothed portion 32 formed on an outside diameter portion 31 thereof which is closer to the intermediate member 50.

In addition, a pawl 33 is pivotally supported in such a manner as to rotate with a pin 34 so as to be brought into engagement with and disengagement from the toothed portion 32 of the ratchet plate 30 at a lower portion of the other end portion of the rotational base portion 40.

This pawl 33 has a tooth 33a which is adapted to be brought into engagement with and disengagement from the toothed portion 32 of the ratchet plate 30, a spring abutment portion 33b which is adapted to be brought into abutment with a coil spring S mounted on a lower end portion of the intermediate member 50 so as to receive a biasing force applied from the coil spring S in a direction in which the tooth 33a is locked on to the toothed portion 32, and a release cam abutment portion 33c which receives a force applied in a direction in which the locking of the tooth 33a with the toothed portion 32 is released by the action of a release cam 35b, which will be described later on.

Two arc-shaped relay rods 35, 36 are inserted in series in an interior of the intermediate member 50. A spring mounting portion 35a where the coil spring S is mounted is formed on a lower end portion of the lower relay rod 35 which lies in a lower position. In this spring mounting portion 35a, a groove (not shown) is formed in a longitudinal direction thereof, the spring abutment portion 33b of the pawl 33 can enter this groove.

The aforesaid release cam 35 is formed above the spring mounting portion 35a. This release cam 35 has an inclined lower edge portion in which an edge portion is inclined which is brought into abutment with the release cam abutment portion 33c of the pawl 33. When the release cam 35b is lowered to thereby push on the release cam abutment portion 33c, the pawl 33 rotates in a direction in which the locking of the tooth 33a with the toothed portion 32 is released.

An upper end portion of the lower relay rod 35 is in abutment with a lower end portion of the upper relay rod 36. The upper relay rod 36 extends as far as the upper end portion of the intermediate member 50. The grip 60 is mounted on the upper end portion of the intermediate member 50. An operating knob 61 is incorporated in a distal end portion of the grip 60. A push rod, not shown, is provided inside the grip, so as to connect the operating knob 61 with the upper relay rod 36 in cooperation with a connecting member, not shown, causing the operating knob 61 and the upper relay rod 36 to be interlocked with each other, whereby by operating the operating knob 61 the relay rods 36, 35 are moved so as to rotate the pin 34, so that the tooth 33a which is locked on to the toothed portion 32 can be released from the locking with the toothed portion 32.

Next, the function will be described.

In FIG. 1, the bolt flanges 11 may only have to be fixed to the floor with the bolts when fixing the base frame 1 to the floor of the body. The parking brake device 2 of the parking brake can be mounted with bolts on the parking device mounting portion 10A formed on the one side A of the base frame main body 1a.

When mounting the parking brake device 2 of the parking brake on the parking device mounting portion 10A of the base frame main body 1a, the operating lever 20 is assembled with the ratchet plate 30 held between the two sheets of metal which make up the rotational base portion 40. The operating lever 20 so assembled is pivotally supported on the base frame main body 1a in such a manner as to rotate by the pivot shaft 21, and the upper end lower end portions of the ratchet plate 30 are fixed to the ratchet plate fixing portions 4, 4 of the base frame main body 1a with bolts. The parking brake device 2 can easily be mounted on the base frame main body 1a in this way.

In a state where the parking brake is not in operation, the tooth 33a of the pawl 33 lies below the toothed portion 32 of the ratchet plate 30, and the tooth 33a is not locked on to the toothed portion. When the grip 60 is pulled up to rise from this state, the rotational base portion 40 rotates about the pivot shaft 21 together with the intermediate member 50. When the rotational base portion 40 rotates, the brake cable 110 is pulled on, whereby the brake-applying portion starts to apply the brake.

When the pulling up of the grip 60 is stopped when the tooth 33a rises to a position where the tooth 32a can be locked on to the toothed portion 32, the coil spring S biases the spring abutment portion 33b so as to cause the tooth 33a to be locked on to the toothed portion 32. The operating lever 20 is pulled in a returning direction by virtue of the tension of the brake cable 110, whereby since the tooth 33a is locked on to the toothed portion 32 strongly, a state can be maintained in which the barking brake is in the brake-applying state.

When the brake-applying state of the parking brake is released, the grip 60 is slightly pulled up so as to offset the force with which the brake cable 110 pulls on the operating lever 20 in advance, and the release cam 35b is then lowered to rotate the release cam abutment portion 33c by pushing the operating knob, whereby the pawl 33 rotates, and the locking of the tooth 33a with the toothed portion 32 is released, the parking brake being allowed to be restored to the non-brake-applying state.

In this embodiment, since the ratchet plate 30 is provided at the position closer to the intermediate member 50 than the pivot shaft 21 in such a manner as to erect therefrom as shown in FIG. 4, the outside diameter thereof can be increased, whereby the meshing load between the toothed portion 32 and the tooth 33a can be reduced. This allows for a reduction in thickness of the ratchet plate 30, and a means for heat treatment can be deleted, thereby making it possible to obtain a large effect of reducing the production costs. In addition, the operation to cause the parking brake to apply the brake is made easy.

Furthermore, since it is possible to reduce the overall length of the operating lever 20 from the pivot shaft 21 which constitutes the center of rotation which includes the rotational base portion 40 and the intermediate member 50, the transverse rigidity of the operating lever 20 can be increased.

The gearshift device of the transmission is mounted on the gearshift device mounting portion 10B which is formed on the other side B of the base frame main body 1a. In addition, the center console 100 is mounted on the console mounting portion 100.

Thus, as has been described heretofore, since the parking brake device 2 of the parking brake, the gearshift device of the transmission and the center console 100 can be mounted on the base frame main body 1a, when compared to a case where the parking brake device 2 of the parking brake, the gearshift device of the transmission and the center console 100 are mounted on separate and different base flanges, respectively, they can be mounted quickly and easily in proper positions, and space can also be secured.

Furthermore, the base frame 1, which is molded into the integral unit through die casting, can not only increase the mounting rigidity but also reduce the weight thereof.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A base frame comprising:
   a plate shape extending in a front-back direction and a vertical direction of a vehicle body, said base frame having a forward facing end, an opposite rearward facing end, and an intermediate portion disposed between said forward facing end and said rearward facing end, said base frame further defining a first side surface facing one direction with respect to a width direction of the body and a second side surface facing the other direction with respect to the width direction of the body, a lower surface facing toward and mounted to said vehicle body and an upper surface facing away from said vehicle body and adapted to mountingly receive a console,
   said base frame rearward facing end defining a parking device mounting portion to which a pivotally movable portion of a parking brake device is pivotally secured, the parking brake device applying and releasing a parking brake;
   said base frame forward facing end further defining a gearshift device mounting portion to which a gearshift device is fixedly provided, the gearshift device controlling a gearshift operation of a transmission;
   said base frame intermediate portion being adapted to mountingly receive a ratchet plate of said parking brake device at two spaced apart locations, wherein said ratchet plate has an upper end fixed to said base frame intermediate portion adjacent the upper surface of the base frame and a lower end fixed to said base frame intermediate portion adjacent the lower surface of the base frame;
   said base frame lower surface defining a body mounted portion that is adapted to be fixed to the vehicle body at said base frame forward facing end and said base frame rearward facing end;
   a ratchet plate fitting configured to fix an upper portion and a lower portion of the ratchet plate of the parking brake device so that an intermediate portion of the ratchet plate is spaced away from the base frame; and
   a pivotally supporting portion in which the operating lever, which is configured to swing along the ratchet plate, is attached;
   wherein the parking device mounting portion is provided on the first side surface of the rearward facing end of the base frame, and the gearshift device mounting portion including a gearshift cable mounting portion is provided on the second side surface of the forward facing end of the base frame.

2. The base frame as set forth in claim 1, wherein the base frame is molded by casting.

3. The base frame as set forth in claim 2, comprising a console mounting portion where a console is mounted.

4. The base frame as set forth in claim 1, further comprising a console mounting portion to which a console is mounted.

5. The base frame as set forth in claim 1, comprising a gearshift cable mounted on the gearshift cable mounting portion, said gearshift cable being adapted to transmit a gearshift operation by the gearshift device to the transmission.

6. The base frame as set forth in claim 1, wherein:
   the ratchet plate is a fixed portion of said parking brake device; and
   the pivotally movable portion of the parking brake device includes the operating lever, said operating lever being pivotally mounted to the rearward end of the base frame and being movable along a length of said ratchet plate.

7. A parking brake comprising a base frame and a parking brake device,
   said parking brake device including a ratchet plate and an operating lever,
   said base frame comprising a plate shape extending in a front-back direction and a vertical direction of a vehicle body, said base frame having a forward facing end, an opposite rearward facing end, and an intermediate portion disposed between said forward facing end and said rearward facing end, said base frame further defining a first side surface facing one direction with respect to a width direction of the body and a second side surface facing the other direction with respect to a width direction of the body, a lower surface facing toward and mounted to said vehicle body and an upper surface facing away from said vehicle body and adapted to mountingly receive a console,
   said base frame rearward facing end defining a parking device mounting portion to which the operating lever of the parking brake device is pivotally secured, the parking brake device applying and releasing a parking brake;
   said base frame forward facing end defining a gearshift device mounting portion to which a gearshift device is fixedly provided, the gearshift device controlling a gearshift operation of a transmission;
   said base frame intermediate portion being adapted to mountingly receive the ratchet plate of said parking brake device at two spaced apart locations, wherein an upper portion of the ratchet plate is fixed at a projecting portion of an upper portion of the base frame, the base frame upper portion projecting portion projecting toward a vehicle side direction, and a lower portion of the ratchet plate is fixed at a lower portion of the base frame;
   said operating lever being swingably provided so that a part of the operating lever overlaps the base frame upper portion projecting portion viewed from a vehicle front-back direction, and is provided to swing between the upper and lower portions of the ratchet plate;
   said base frame lower surface defining a body mounted portion that is adapted to be fixed to the vehicle body at said base frame forward facing end and said base frame rearward facing end; and wherein the parking device mounting portion is provided on the first side surface of the intermediate portion and rearward facing end of the base frame, and the gearshift device mounting portion including a gearshift cable mounting portion is provided on the second side surface of the forward facing end of the base frame;

said parking brake device comprising:

the ratchet plate, which is fixedly provided on the intermediate portion of the base frame and comprises a toothed portion on an outside diameter portion thereof;

a pawl which is adapted to engage with and disengage from the toothed portion of the ratchet plate;

the operating lever comprising:

a rotational base portion having a forward end and a rearward end, said rearward end of the rotational base portion being pivotally mounted to the rearward end of the base frame by a pivot shaft and to which a brake cable is connected; and, an intermediate member which extends upwardly from the forward end of the rotational base portion;

wherein the ratchet extends upwardly and downwardly beyond the rotational base portion, is formed into an arc that extends rearwards from a lower end toward an upper end thereof, and is adapted to be engaged by the pawl, which is carried by the rotational base portion.

8. The parking brake as set forth in claim 7, wherein a longitudinal length of the ratchet plate is longer than a width in a pivoting direction of the rotational base portion.

9. The parking brake according to claim 7, wherein the rotational base portion is formed as two plate-shaped pieces, said plate-shaped pieces being attached to each other such that a gap is formed therebetween through which said ratchet plate extends.

* * * * *